(12) United States Patent
Kim et al.

(10) Patent No.: US 9,426,313 B2
(45) Date of Patent: Aug. 23, 2016

(54) MOBILE DEVICE, IMAGE FORMING APPARATUS, AND METHOD FOR PROVIDING MANUAL

(71) Applicant: Samsung Electronics Co., Ltd., Suwon-si (KR)

(72) Inventors: Hye-soo Kim, Suwon-si (KR); Tae-jung Yun, Seoul (KR); Yeon-hee Jung, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/601,543

(22) Filed: Jan. 21, 2015

(65) Prior Publication Data
US 2015/0365542 A1    Dec. 17, 2015

(30) Foreign Application Priority Data

Jun. 16, 2014  (KR) .................. 10-2014-0072865

(51) Int. Cl.
*H04N 1/00* (2006.01)
*H04N 1/32* (2006.01)

(52) U.S. Cl.
CPC ....... *H04N 1/00079* (2013.01); *H04N 1/00307* (2013.01); *H04N 1/32101* (2013.01); *H04N 2201/3284* (2013.01)

(58) Field of Classification Search
CPC .................................................. H04N 1/00079
USPC ....................... 358/1.15, 1.14, 1.13
See application file for complete search history.

(56) References Cited

U.S. PATENT DOCUMENTS

| | | | |
|---|---|---|---|
| 2005/0141013 A1* | 6/2005 | Kikuchi ............... | G06F 3/1204 358/1.14 |
| 2011/0270771 A1* | 11/2011 | Coursimault .......... | G06Q 10/06 705/304 |
| 2012/0026530 A1* | 2/2012 | Tsongas ............. | H04N 1/00307 358/1.14 |
| 2013/0021641 A1* | 1/2013 | Park ........................ | G06F 3/121 358/1.14 |
| 2014/0307282 A1* | 10/2014 | Sato ................... | H04N 1/00307 358/1.14 |
| 2015/0085317 A1* | 3/2015 | Kim ....................... | G06F 3/0486 358/1.15 |

* cited by examiner

*Primary Examiner* — Jacky X Zheng
(74) *Attorney, Agent, or Firm* — Staas & Halsey LLP

(57) ABSTRACT

A mobile device is provided. The mobile device includes an imaging unit configured to generate an image, a communication interface configured to receive status information from an image forming apparatus corresponding to the generated image, a controller configured to control the communication interface to receive manual information on the image forming apparatus according to the received status information, and a display configured to synthesize and display the generated image and the received manual information.

16 Claims, 24 Drawing Sheets

DISPLAY JOB: DISPLAY PAPER REMOVAL

MR SCREEN IN CASE OF PRINTER ERROR
(SELECT JOB FORWARD)

MR SCREEN IN CASE OF PRINTER ERROR
(SELECT JOB FORWARD)

AaBbCcDdEeFfGgHhIiJjKk
AaBbCcDdEeFfGgHhIiJjKk
AaBbCcDdEeFfGgHhIiJjKk
AaBbCcDdEeFfGgHhIiJjKk
AaBbCcDdEeFfGgHhIiJjKk
AaBbCcDdEeFfGgHhIiJjKk
AaBbCcDdEeFfGgHhIiJjKk
AaBbCcDdEeFfGgHhIiJjKk

MOBILE DEVICE, IMAGE FORMING APPARATUS, AND METHOD FOR PROVIDING MANUAL

CROSS-REFERENCE TO RELATED APPLICATIONS

This application claims priority benefit under 35 U.S.C. §119 from Korean Patent Application No. 10-2014-0072865 filed on Jun. 16, 2014 in the Korean Intellectual Property Office, the disclosure of which is incorporated herein by reference in its entirety.

BACKGROUND

1. Field

Embodiments generally relates to a mobile device, an image forming apparatus, and a method for providing a manual thereof, and more particularly, to a mobile device configured to, in response to an error occurring in an image forming apparatus, provide a manual for resolving the error in a form of augmented reality, an image forming apparatus, and a method for providing a manual thereof.

2. Description of the Related Art

Generally, an image forming apparatus refers to an apparatus which prints out print data generated in a terminal device, such as a computer, on a recording paper. For example, an image forming apparatus may include a copy machine, a printer, a facsimile, or a Multi Function Peripheral (MFP) where functions of a copy machine, a printer, and a facsimile are embodied in a single apparatus.

Such image forming apparatus has mechanical characteristics, and thus, in many cases, a user should resolve a mechanical defect or operational problem.

Accordingly, the conventional image forming apparatus has been provided with a printed manual or an electronic manual for helping a user to resolve a problem of the image forming apparatus. However, such printed manual or electronic manual has a limit of a static connection and solution.

SUMMARY

In an aspect of one or more embodiments, there is provided one or more embodiments to address the aforementioned and other problems and disadvantages occurring in the related art. In an aspect of one or more embodiments, there is provided a mobile device configured to, in response to an error occurring in an image forming apparatus, provide a manual for resolving the error in a form of augmented reality, an image forming apparatus, and a method for providing a manual thereof.

In an aspect of one or more embodiments, there is provided a mobile device which includes an imaging unit configured to generate an image, a communication interface configured to receive status information from an image forming apparatus corresponding to the generated image, a controller configured to control the communication interface to receive manual information on the image forming apparatus according to the received status information, and a display configured to synthesize and display the generated image and the received manual information.

In response to a status of the image forming apparatus being determined as an error status based on the received status information, the controller may control the communication interface to receive manual information including user manipulation information for resolving the error status.

The controller may control the display to display an apparatus region of the image forming apparatus corresponding to the user manipulation information from the sensed apparatus region and display the user manipulation information of the sensed apparatus region.

The communication interface may receive sensor information sensed by a sensor of the image forming apparatus from the image forming apparatus. In addition, the controller may determine whether a user manipulation with respect to the image forming apparatus is a manipulation corresponding to the user manipulation information based on the received sensor information.

In response to the user manipulation being determined as corresponding to the user manipulation information, the controller may control the display to display user manipulation information on a next step.

In response to the user manipulation being determined as not corresponding to the user manipulation information, the controller may control the display to display a message indicating that the user manipulation was performed incorrectly.

In response to a status of the image forming apparatus being determined as an error status based on the received status information, the controller may control the communication interface to request for manual information including user manipulation information resolving the error status to a management server.

In response to a status of the image forming apparatus being determined as an error status based on the received status information, the controller may control the communication interface to search for an image forming apparatus which is adjacent to the image forming apparatus and transfer an ongoing operation to the searched image forming apparatus.

The status information may include at least one of model information on the image forming apparatus, error information on the image forming apparatus, and sensor information sensed by a sensor of the image forming apparatus.

The display may display the received manual information on the generated image in a form of augmented reality.

The display may extract an appearance of the image forming apparatus from the generated image and display the manual information on a position corresponding to the manual information in the extracted appearance.

The imaging unit may generate an image of an output of the image forming apparatus. In addition, in response to maintenance of the image forming apparatus being necessary based on the generated image, the controller may control the communication unit to receive manual information for the maintenance.

The imaging unit may generate an image of a manuscript stored in a scanning unit of the image forming apparatus. In addition, the controller may control the display to determine a direction of the manuscript stored in the scanning unit based on the generated image, and in response to the direction of the manuscript being determined as being incorrect, display an error message.

The mobile device may further include a manipulation input unit configured to receive a job command for a job to be executed in the image forming apparatus. In addition, the communication interface may transmit the received job command to the image forming apparatus.

The manipulation input unit may receive a selection of address information corresponding to the job command from one of address information stored in the mobile device.

The communication interface may receive information registered by other user on the image forming apparatus. In addition, the controller may control the display to display the information registered by other user.

The information registered by other user may be at least one of a message uploaded to a Social Network Service (SNS) in connection with the image forming apparatus and a moving image recorded with other user.

An image forming apparatus according to an exemplary embodiment includes a communication interface configured to transmit status information and manual information on the image forming apparatus to a mobile device, a sensor configured to sense a status change of components of the image forming apparatus, and a controller configured to, in response to the status change being sensed by the sensor, control the communication interface to transmit the sensed status change to the mobile device.

A method for providing a manual according to an exemplary embodiment may include generating an image, receiving status information from an image forming apparatus corresponding to the generated image, receiving manual information on the image forming apparatus according to the received status information, and synthesizing and displaying the generated image and the received manual information.

A computer readable recording medium having a program for executing a method for providing a manual according to an exemplary embodiment includes generating an image, receiving status information from an image forming apparatus corresponding to the generated image, receiving manual information on the image forming apparatus according to the received status information, and synthesizing and displaying the generated image and the received manual information.

In an aspect of one or more embodiments, there is provided at least one non-transitory computer readable medium storing computer readable instructions which when executed implement methods of one or more embodiments.

BRIEF DESCRIPTION OF THE DRAWINGS

The above and/or other aspects will be more apparent by describing exemplary embodiments with reference to the accompanying drawings, in which:

FIGS. 14 to 16 are diagrams provided to describe a method for providing a manual according to a third exemplary embodiment;

DETAILED DESCRIPTION

Figure 1:
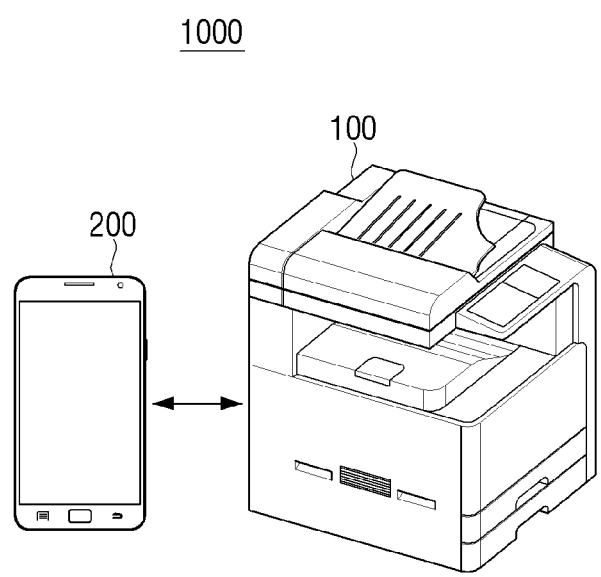
FIG. 1 is a block diagram illustrating an image forming system according to an exemplary embodiment.

Reference will now be made in detail to embodiments, examples of which are illustrated in the accompanying drawings, wherein like reference numerals refer to the like elements throughout. Embodiments are described below by referring to the figures.

The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating an image forming system according to an exemplary embodiment.

Referring to FIG. 1, an image forming system 1000 may include an image forming apparatus 100 and a mobile device 200. The image forming apparatus 100 may be connected to the mobile device 200 and transmit its own status information to the mobile device 200 in response to a request of the mobile device. The image forming apparatus 100 may be a copy machine, a printer, a facsimile, or an MFP where functions of a copy machine, a printer, and a facsimile are embodied in a single apparatus.

The image forming apparatus 100 may perform various operations according to the instructions of the mobile device 200. In addition, the image forming device 100 may includes various sensors for sensing a status change of each component in the apparatus and transmit sensor information sensed by the sensors to the mobile device 200.

The image forming apparatus 100 may be a printer, a scanner, a copy machine, or a facsimile which may perform at least one function among a scanning function, a printing function, a fax function, and a copy function or may be a MFP which includes all the functions. The structure and operations of the image forming apparatus 100 will be described in detail below with reference to FIG. 3.

The mobile device 200 may be connected to the image forming apparatus 100 and receive status information from the connected image forming apparatus 100. In response to the received status information, the mobile device 200 may request for manual information to the image forming apparatus 100 or a management server 300 and receive the manual information.

In response to a status of the image forming apparatus being determined as an error status, the mobile device 200 may request for manual information for resolving the error status to the management server and receive the manual information. In response to the status of the image forming apparatus 100 being determined as a normal status without any error, the mobile device 200 may receive manual information for executing functions of the image forming apparatus 100 (for example, information on an operation which is executable in the image forming apparatus and a method for executing the operation.)

The mobile device 200 may generate an image by using an imaging unit and generate and display an augmented reality image where the received manual information is reflected on the generated image. The augmented reality refers to a method of combining and complementing a virtual object and information generated by a computer skill in a real world and is also called a Mixed Reality (MR).

The mobile device 200 may receive a control command for controlling the image forming apparatus through the displayed augmented reality image and provide the received control command to the image forming apparatus 100.

In addition, the mobile device 200 may receive sensor information sensed by the image forming apparatus 100 from the image forming apparatus 100 and determine whether a user manipulation (to be specific, a user manipulation with respect to the image forming apparatus) is appropriate based on the received sensor information. In response to the user manipulation being determined as being appropriate, the mobile device 200 may provide manual information on a next step. Otherwise, the mobile device 200 may inform that an appropriate manipulation is required. The mobile device 200 may be a laptop computer, notebook computer, a tablet; a mobile phone, a smart phone, a Portable Multimedia Player (PMP), an MP3 player, a personal digital assistant (PDA), a digital camera, a wearable device, etc. The specific structure and operations of the mobile device 200 will be described below with reference to FIG. 4.

As described above, the image forming apparatus 100 according to an exemplary embodiment may control the image forming apparatus 100 in the mobile device 200, and thus, a user is able to control the image forming apparatus more easily. In addition, the mobile device 200 provides information on the image forming apparatus 100 in a form of the augmented reality, and thus, the user is able to manipulate the image forming apparatus 100 more intuitionally. Further, the image forming apparatus 100 provides information on a status change according to the user manipulation to the mobile device 200, and thus, the mobile device 200 may provide information according to interaction rather than provide information unidirectionally.

In FIG. 1, one mobile device is connected to one image forming apparatus. However, in the implementation, one mobile device may be connected to a plurality of image forming apparatuses, and each image forming apparatus may be connected to a plurality of mobile devices.

In addition, in the implementation, each apparatus may be directly connected or may be indirectly connected through a router or other apparatus (for example, server). In addition, in the illustrated examples, each apparatus is connected in a wired manner, but the apparatus may be connected wirelessly in the implementation.

Figure 2:
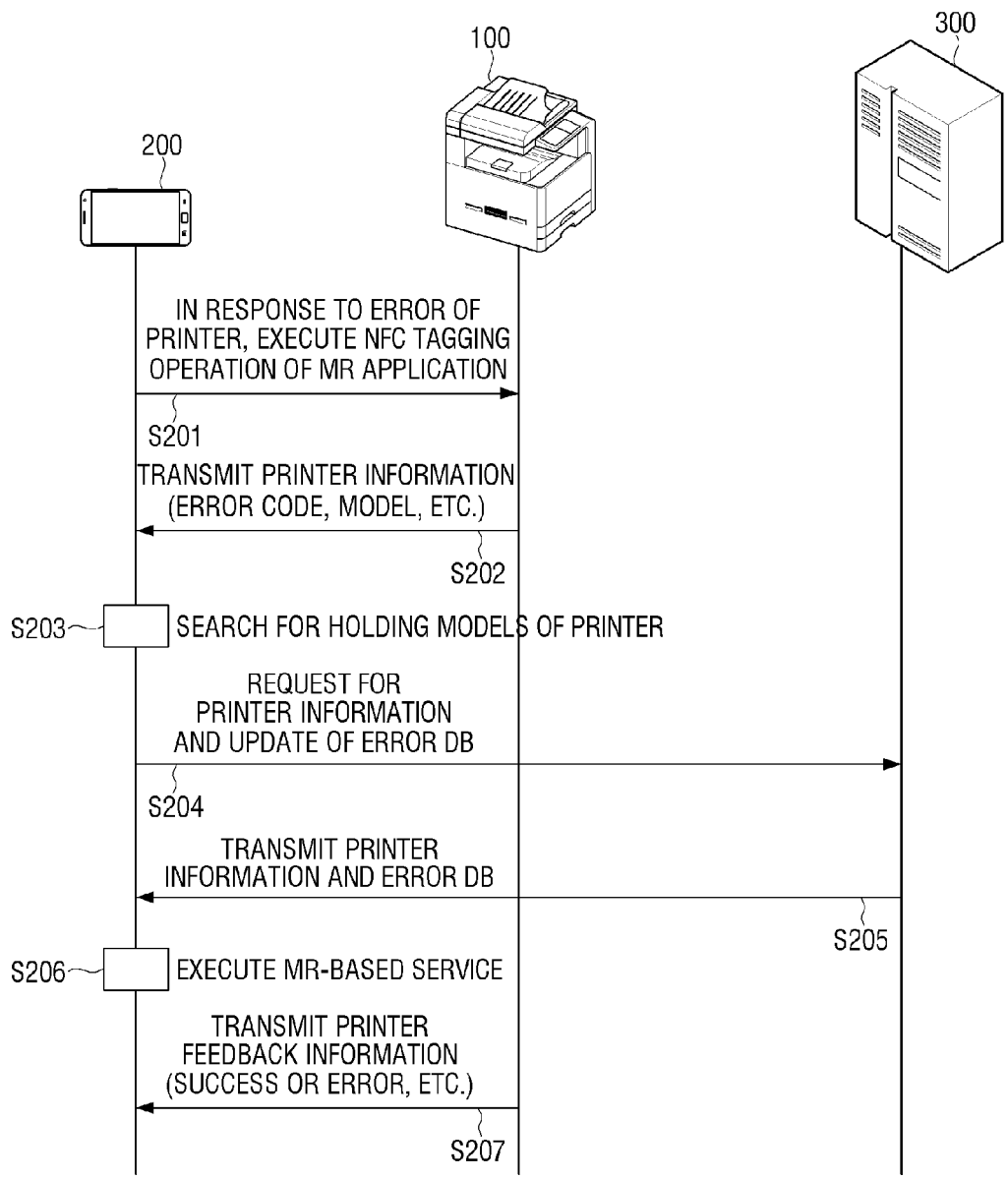
FIG. 2 is a sequence diagram provided to describe a method for providing a manual according to an exemplary embodiment.

FIG. 2 is a sequence diagram provided to describe a method for providing a manual according to an exemplary embodiment.

Referring to FIG. 2, the mobile device 200 may receive a selection of the image forming apparatus 100 to be connected (S201). To be specific, a user of the mobile device 200 is able to select the image forming apparatus 100 to be connected by performing a Near Field Communication (NFC) tagging operation with the image forming apparatus 100. In an implementation, it is possible to search for a connectable image forming apparatus in the mobile device 200 and receive a selection of one of the searched image forming apparatuses as an image forming apparatus to be connected. In response to the tagging operation or the selection being performed, an application for providing a manual may be executed. In the implementation, the selection may be executed after the application is executed.

In response to the image forming apparatus 100 to be connected being selected, the mobile device 200 may receive apparatus information from the selected image forming apparatus 100 (S202). In this case, the apparatus information may include apparatus information on a function supported by the image forming apparatus and in response to an error occurring in the image forming apparatus, may include code information on the error and a model number, etc.

The mobile device 200 which received the apparatus information may determine whether manual information on the selected image forming apparatus exists (S203), request for the manual information on the selected image forming apparatus 100 to an external management server 300, and receive the manual information from the external management server 300 (S204, S205). In an exemplary embodiment, it is described that the manual information is received through the external management server 300. However, in the implementation, the manual information may be received from the image forming apparatus 100. In addition, an object to receive the manual information may vary according to whether an error occurs in the image forming apparatus 100. For example, in response to non-existence of an error of the image forming apparatus 100, manual information for controlling a function of the image forming apparatus may be received from the image forming apparatus 100. In response to existence of an error of the image forming apparatus 100, manual information for resolving the error may be received from the management server 300.

The mobile device 200 which received the manual information may generate a photograph image by using the imaging unit and generate and display an augmented reality image where the received manual information is reflected on the generated photograph image (S206).

If the image forming apparatus 100 has an error, in response to a user manipulation for resolving the error being performed with respect to a configuration of the image forming apparatus 100, the image forming apparatus may sense a change of the configuration corresponding to the user manipulation and notify the sensed configuration change to the mobile device 200 (S207). Through such process, information may be provided in an interactional manner, not a common unidirectional manner.

In FIG. 2, the aforementioned manual is provided in response to the occurrence of an error in the image forming apparatus 100. However, in the implementation, the manual may be provided even though any error does not occur. Other operation examples will be described below with reference to FIGS. 11 to 21.

Figure 3:
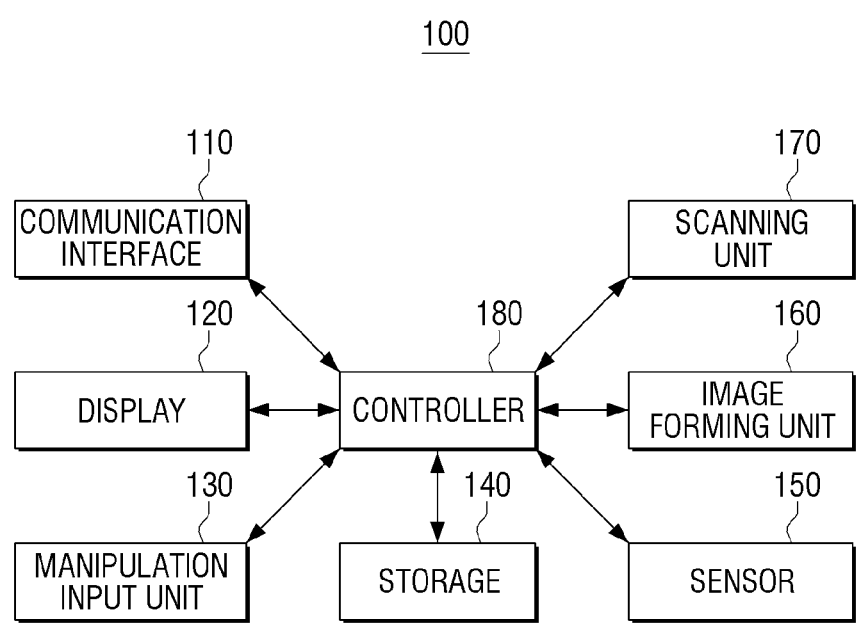
FIG. 3 is a diagram illustrating a specific structure of an image forming apparatus of FIG. 1.

FIG. 3 is a diagram illustrating a specific structure of an image forming apparatus of FIG. 1.

Referring to FIG. 3, the image forming apparatus 100 according to an exemplary embodiment may include a communication interface 110, a display 120, a manipulation input unit (manipulator) 130, a storage 140, a sensor 150, an image forming unit 160, a scanning unit (scanner) 170, and a controller 180. The image forming apparatus 100 may be a copy machine, a printer, a facsimile, or an MFP where functions of a copy machine, a printer, and a facsimile are embodied in a single apparatus.

The communication interface 110 is a component for connecting the image forming apparatus 100 to an external apparatus. The communication interface 110 may be accessed through a Universal Serial Bus (USB) port and a wireless module as well as a Local Area Network (LAN) and an internet network. In this case, the wireless module may be Wireless-Fidelity (Wi-Fi), Wi-Fi Direct, Near Field Communication (NFC), Bluetooth, etc.

The communication interface 110 may transmit apparatus information to the mobile device 200. To be specific, the communication interface 110 may transmit apparatus information including general information, such as information on a model number, functions supported by the image forming apparatus, etc., and status information, such as information on an error of the image forming apparatus 100, a code of the error, etc., to the mobile device 200.

The communication interface 110 may receive a job execute command from the mobile device 200. In addition, the communication interface 110 may transmit or receive data related to the job execute command. For example, in response to a user's job command for printing out a particular file, the communication interface 110 may receive a print file. In this case, the print file may be data in a printer language such as Postscript (PS), Printer Control Language (PCL), etc., or may be a file in a format such as PDF, XPS, BMP, JPG., etc.

In response to the user's job command being a scan command, the communication interface 110 may transmit scan data that is a result of a scanning job to the mobile device 200 or another storage (not shown).

The communication interface 110 may notify a progressing status of the requested job command to the mobile device 200.

The communication interface 110 may transmit manual information to the mobile device 200. To be specific, the communication interface 110 may transmit manual information on the current image forming apparatus stored in the storage 140 to the mobile device 200. The storage 140 will be described below. In the implementation, the entire manual information may be transmitted to the mobile device 200 in a lump sum, or only the information which is currently requested in the mobile device 200, that is, only a part of the manual information may be transmitted to the mobile device.

The communication interface 110 may transmit sensor information sensed by the sensor 150 to the mobile device 200. The sensor 150 will be described below. In the implementation, in response to a change of a sensor among the entire sensors in the image forming apparatus 100, the communication interface 110 may transmit information on only the changed sensor to the mobile device 200 or transmit sensor information on the entire sensors in the image forming apparatus 100 to the mobile device 200 in real time.

The display 120 may display various information supported by the image forming apparatus 100. The display 120 may be a monitor such as a Liquid Crystal Display (LCD), a Cathode-Ray Tube (CRT), etc, or may be embodied as a touch screen which is capable of performing functions of the manipulation input unit 130 simultaneously. The manipulation input unit 130 will be described below.

The display 120 may display a screen for controlling functions of the image forming apparatus 100. In addition, the display 120 may display a manual for receiving an input of function control (or error resolution) of the image forming apparatus 100.

The manipulation input unit 130 includes a plurality of function keys which enable a user to set or select various functions supported by the image forming apparatus 100. The manipulation input unit 130 may be embodied as a device such as a mouse or a keyboard, or may be embodied as a touch screen which is capable of performing the functions of the display 120 simultaneously.

The storage 140 stores a print file. To be specific, the storage 140 may store a print file received through the communication interface 110. In addition, the storage 140 may store an electronic manual with respect to the image forming apparatus 100. In addition, the storage 140 may store a scan image generated by the scanning unit 170. The scanning unit 170 will be described below. The storage 140 may be embodied as a storage medium in the image forming apparatus 100 or an external storage medium such as a removable disk including a USB memory, a web server through a network, etc.

The sensor 150 senses a status change of each component in the image forming apparatus. To be specific, the sensor 150 includes various sensors for sensing whether the components in the image forming apparatus are connected correctly or operate well, whether a necessary paper or toner is provided, or whether a door is open. In addition, the sensor 150 may sense a status change of each sensor.

The image forming unit 160 forms an image. To be specific, the image forming unit 160 may print out the print file received through the communication interface 110 or may print out the scan image generated by the scanning unit 170.

The scanning unit 170 scans a manuscript and generates a scan image. To be specific, in response to a user's job execute command being a copy command, a scan command, and a fax command, the scanning unit 170 may scan a manuscript and generate a scan image. In response to the user's job execute command being a scan command, the scanning unit 170 may transmit a scan image to the communication interface 110 so that the generated scan image is stored in a predetermined storage. In response to the user's job execute command being a copy command, the scanning unit 170 may transmit the generated scan image to the image forming unit 160 so that the generated scan image is printed. In response to the user's job execute command being a fax command, the scanning unit 170 may transmit the generated scan image to a facsimile or the communication interface 110 so that the generated scan image is faxed. Although the example does not include a facsimile, the image forming apparatus 100 may further include a facsimile for receiving or transmitting a fax.

The controller 180 controls each component in the image forming apparatus 100. To be specific, in response to the mobile device 200 being connected through the communication interface 110, the controller 180 may transmit the apparatus information including the status information to the mobile device 200. In addition, in response to the electronic manual of the image forming apparatus 100 being stored in the storage 140, the controller 180 may transmit the stored electronic manual to the mobile device 200. In response to a job execute command being received from the mobile device 200, the controller 180 may control the image forming unit 160 and the scanning unit 170 so that a job corresponding to the received job execute command is executed.

In response to a status change of each component in the image forming apparatus 100 being sensed by the sensor 150, the controller 180 may control the communication interface 110 to transmit the sensed status information to the mobile device 200.

As described above, the image forming apparatus 100 according to an exemplary embodiment may perform a job corresponding to a control command received from the mobile device 200. Accordingly, a user is easily able to input a job command with respect to the image forming apparatus. In addition, the image forming apparatus 100 provides the mobile device 200 with a status change in the image forming apparatus 100 occurred as the manual information is provided, and thus, information may be provided in an interactional manner according to a user manipulation.

It was described that the image forming apparatus 100 includes both of the image forming unit 160 and the scanning unit 170, but the image forming apparatus 100 may be embodied to have only one of the image forming unit 160 and the scanning unit 170.

Figure 4:
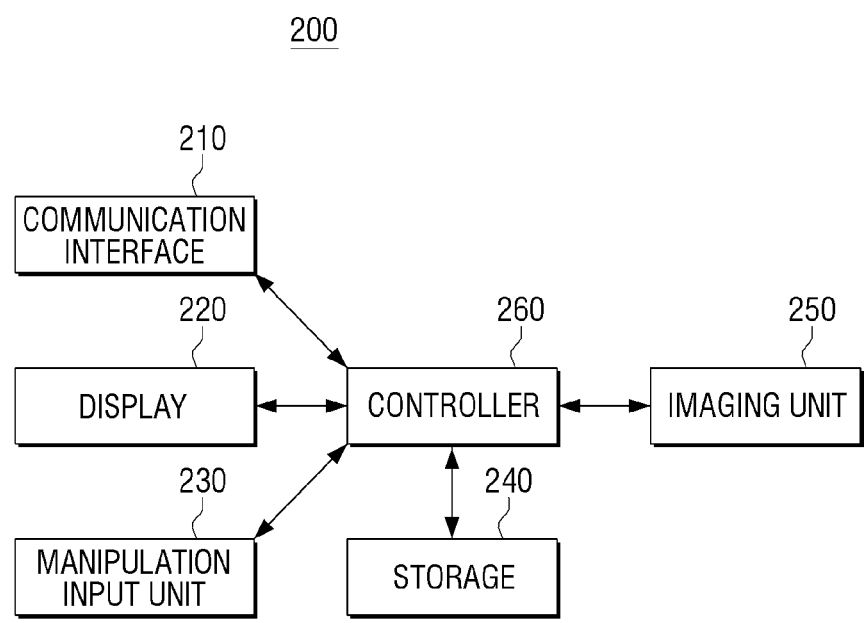
FIG. 4 is a diagram illustrating a specific structure of a mobile device of FIG. 1.

FIG. 4 is a diagram illustrating a specific structure of a mobile device of FIG. 1.

Referring to FIG. 4, the mobile device 200 according to an exemplary embodiment may include a communication interface 210, a display 220, a manipulation input unit (manipulator) 230, a storage 240, an imaging unit 250, and a controller 260. In this case, the mobile device 200 may be a laptop computer, a mobile phone, a smart phone, a PMP, an MP3 player, etc., which is portable and may communicate with the image forming apparatus 100.

The communication interface 210 is a component for connecting the mobile device 200 to an external apparatus. The communication interface 210 may be accessed through a USB port and a wireless module as well as an LAN and an internet network. In this case, the wireless module may be Wi-Fi, Wi-Fi Direct, NFC, Bluetooth, Infrared Rays (IR), etc.

The communication interface 210 may search for the image forming apparatus 100 which is connectable. In addition, the communication interface 210 may receive the apparatus information from the connectable image forming apparatus 100. In this case, the apparatus information may include information on the functions supported by the image forming apparatus 100, a model number and may include the status information on a current error status of the image forming apparatus 100, an error code, and a currently pending job. The communication interface 210 may receive the apparatus information on all of the connectable image forming apparatuses, or may receive only the apparatus information on the image forming apparatus that is an object to be photographed by a user.

The communication interface 210 receives manual information. To be specific, in response to the image forming apparatus storing manual information, the communication interface 210 receives the manual information from the image forming apparatus. Otherwise, the communication interface 210 may receive manual information corresponding to a model number of the image forming apparatus from the management server 300. In this case, the manual information may be the entire manual information with respect to the image forming apparatus 100 or may be manual information on a particular situation or function. For example, in response to a jam occurring in an image forming apparatus, the communication interface 210 may transmit a model number of the image forming apparatus and an error code corresponding to the jam to the management server 300 and receive manual information for resolving the jam problem of the image forming apparatus. The manual information may include user manipulation information for the augmented reality and information on an apparatus region corresponding to the user manipulation information. The augmented reality will be describe below.

The communication interface 210 may receive sensor information sensed by the sensor 150 of the image forming apparatus 100 from the image forming apparatus 100. The received sensor information may be information on the changed sensor in the image forming apparatus 100 or may be information on the entire sensors in the image forming apparatus 100.

The communication interface 210 may receive information registered by other user with respect to image forming apparatus 100 from the management server 300. In this case, the information registered by other user may be a message uploaded to the SNS or a moving image photographed and uploaded by other user.

The communication interface 210 may transmit a job execute command to the selected image forming apparatus 100. In this case, the job execute command may be a job execute command related to the functions supported by the image forming apparatus 100, such as a scan command, a print command, a fax command, a copy command, etc. In this case, the communication interface 210 may transmit option information or job data related to the job execute command along with the job execute command.

The communication interface 210 may receive information on a job progressing status in the image forming apparatus 100. In addition, in response to a scanning job in the image forming apparatus 100 being completed, the completion of the scanning job may be notified to the communication interface 210. In addition, the communication interface 210 may receive scan data that is a result of the scanning job.

The communication interface 210 may request to the management server 300 to call a service engineer for fixing the image forming apparatus 100. To be specific, in response to a call command for a service engineer being received through the manipulation input unit 230, the communication interface 210 may request to the management server 300 to call the service engineer. The manipulation input unit 230 will be described below.

The display unit 220 may display various information supported by the mobile device 200. The display 220 may be a monitor such as an LDC, a CRT, etc., or may be embodied as a touch screen which is capable of performing the functions of the manipulation input unit 230 simultaneously. The manipulation input unit 230 will be described below.

The display 220 may display a list of applications installed in the mobile device 200. In addition, the display 220 may display an execution screen according to an operation of an application.

In addition, the display 220 may display a screen for selecting an image forming apparatus to perform a job. To be specific, the display 220 may display a connectable image forming apparatus. In response to a particular application being executed as a user performs a NFC tagging operation with an image forming apparatus, the display operation may be omitted.

The display 220 may display a screen for receiving a selection of a job to be executed in the selected image forming apparatus. To be specific, the display 220 may display a screen for receiving an input of a function to be executed in the selected image forming apparatus and an option of the function (for example, a scan option). Although it was described that a selection of a job and a scan option is received after the image forming apparatus is selected, the image forming apparatus may be selected after a job is selected first, in the implementation. Such job selection may be received through a common User interface (UI) screen or may be received through an augmented reality image. This operation will be described below with reference to FIGS. 17 to 19.

The display 220 displays an augmented reality image. To be specific, the display 220 may synthesize and display the image generated in the imaging unit 250 and the received manual information in a form of augmented reality. The imaging unit 250 will be described below. For example, in response to a jam occurring in the image forming apparatus 100, the display 220 may display manual information along with an image photographed the image forming apparatus 100 on an apparatus region that should be manipulated by a user to resolve the jam. Examples of a user interface window which is displayed in that case will be described below with reference to FIGS. 5 to 10.

The display 220 may display information registered by other user, which is received from the management server 300. In case of the information registered by other user being a moving image, the display 220 may display the moving image received from the management server 300.

The display 220 may display a progressing status of a requested job. In response to the completion of the job requested by the image forming apparatus 100 being notified through the communication interface 210, the display 220 may display that the requested job is completed.

The manipulation input unit 230 may include a plurality of functions keys which enables a user to set or select various functions supported by the mobile device 200. The manipulation input unit 230 may be embodied as a device such as a mouse, a keyboard, etc., or may be embodied as a touch screen which is capable of performing the functions of the display 220 simultaneously.

The manipulation input unit 230 may receive an application execute command. To be specific, when a user wishes to use an image forming apparatus, the user is able to input an execute command with respect to a particular application by executing an application installed in the mobile device 200 or performing a NFC tagging operation with the image forming apparatus.

In addition, the manipulation input unit 230 may receive a selection of an image forming apparatus to perform a job from among a plurality of connectable image forming apparatuses.

The manipulation input unit 230 may receive an input of a job to be executed in the selected image forming apparatus. To be specific, the manipulation input unit 230 may receive an input of a function to be executed in the selected image forming apparatus and an option of the function (for example, a print option, a scan option, etc.)

In addition, the manipulation input unit 230 may receive a selection of a manual method to be applied to the selected image forming apparatus from among a plurality of manual methods. For example, in response to an image forming apparatus having several methods for resolving an error, the manipulation input unit 230 may receive a selection of one of the several methods.

The manipulation input unit 230 may receive a selection of a job which is pending in the selected image forming apparatus 100 and another image forming apparatus to process the pending job. For example, in response to unavailability of an immediate execution of a job due to an error which occurred in the selected image forming apparatus, a user is able to receive a selection of another image forming apparatus to execute a job and a pending job to be executed in the image forming apparatus through the manipulation input unit 230.

The storage 240 may store various information received through the communication interface 210 (for example, apparatus information, scan information, and manual information) and scan data. In addition, the storage 240 may store an image generated in the imaging unit 250. The imaging unit 250 will be described below. The storage 240 may be embodied as a storage medium in the mobile device 200 or an external storage medium, for example, a removable disk including a USB memory, a web server through a distributed network of storage media, etc.

The imaging unit 250 generates an image. To be specific, the imaging unit 250 may generate consecutive images (that is, a moving image) through an imaging device.

The controller 260 controls each component in the mobile device 200. To be specific, in response to an application execute command for using an image forming apparatus being received from a user, the controller 260 may control the communication unit 210 to search for a connectable image forming apparatus.

The controller 260 may control the display 220 and the manipulation input unit 230 so that the searched image forming apparatus is displayed and selected. In addition, the controller 260 may control the communication interface 210 to receive the status information on the image forming apparatus selected by the user and receive manual information corresponding to the received status information. For example, in response to an image forming apparatus having a jam error and manual information for resolving the jam error, the controller 260 may control the communication interface 210 to receive the manual information for resolving the jam error from the image forming apparatus. When the image forming apparatus 100 does not have the manual information for resolving the jam error or does not have any manual information, the controller 260 may transmit a model number of the selected image forming apparatus 100 and an error code to the management server 300 and control the communication interface 210 to receive the manual information for resolving the jam error.

In response to the manual information being received, the controller 260 may control the imaging unit 250 to generate an image and control the display 220 to display the generated image and the received manual information in a form of the augmented reality image. To be specific, the controller 260 may extract an appearance of the image forming apparatus from the generated image and sense an apparatus region corresponding to the user manipulation information from the extracted appearance.

In response to a user manipulation with respect to a particular apparatus region being performed by the display, the image forming apparatus 100 senses a change of a sensor according to the user manipulation and notifies the sensed change to the mobile device 200. Accordingly, the controller 260 determines whether the user manipulation corresponds to user manipulation information based on sensor information transmitted from the image forming apparatus 100. For example, when a user manipulation information relates to opening a toner cover but the change sensed by the image forming apparatus relates to opening other component, the controller 260 may determine that the user manipulation is incorrect.

In this case, that is, in response to the user manipulation being determined as not corresponding to the user manipulation information, the controller 260 may control the display 220 to display a message informing that the user manipulation was performed incorrectly.

In response to the user manipulation being determined as corresponding to the user manipulation information, the controller 260 may control the display 220 to display user manipulation information on a next step.

In response to a manual method pre-selected by a user not being a method which is processed by the user, the controller 260 may control the communication interface 210 to call a service engineer through the management server.

In addition, the controller 260 may control the communication interface 210 so that an adjacent image forming apparatus is searched and a job which is pending in a current image forming apparatus is executed in the searched image forming apparatus. This process may be executed by sending a command for transmitting a particular job in the image forming apparatus 100 where an error occurred to other image forming apparatus. Alternatively, the process may be executed by transmitting a command for cancelling the particular job in the image forming apparatus where an error occurred and then requesting for a job corresponding to the cancelled particular job to the adjacent image forming apparatus which was newly selected. In this case, the adjacent image forming apparatus may satisfy a predetermined condition requiring an image forming apparatus which is located on the same subnet or an image forming apparatus which uses the same access point.

The controller 260 may analyze a generated image and determine whether the generated image requires maintenance. To be specific, in response to an image of an output of the image forming apparatus 100 being generated in the imaging unit 250, the controller 260 may analyze the generated image and determine whether correction or cleaning is necessary. In response to the image being determined as requiring the correction or cleaning, the controller 260 may provide a user with manual information for executing the correction or cleaning or transmit a command for the correction or cleaning to the selected image forming apparatus 100 directly.

In addition, the controller 260 may analyze the generated image and determine whether a user manipulation is appropriate. To be specific, in response to an image of a manuscript stored in the scanning unit being generated in the imaging unit 250, the controller 260 may analyze the generated image and determine whether the manuscript is arranged in a correct direction. In response to an arrangement direction of the manuscript being determined as incorrect, the controller 260 may control the display 220 to display a message informing that the manuscript needs to be arranged in a correct direction.

In response to a job command with respect to the image forming apparatus 100 being received, the controller 260 may transmit the received job command to the image forming apparatus 100. In this case, the controller 260 may receive a selection of address information pre-stored in the mobile device 200 from a user and transmit, to the image forming apparatus 100, a command for transmitting scan data to a pre-stored address or a command for transmitting a fax to the pre-stored address. Accordingly, the user is able to input a job command easily by using the address information stored in the mobile device 200 without inputting an address or a telephone number to input a scan command and a fax command.

In addition, the controller 260 may control the communication interface 210 and the display 220 to receive and display the information registered by other user from the management server according to a user choice.

As above, the mobile device 200 according to an exemplary embodiment enables a user to control the image forming apparatus easily on the mobile device 200. In addition, the mobile device 200 provides information and control with respect to an apparatus in a form of the augmented reality, and thus, a user is able to manipulate the image forming apparatus 100 more intuitively. Further, the mobile device 200 receives a feedback regarding a change of the image forming apparatus according to the user manipulation from the image forming apparatus, and thus, information may be provided in an interactional manner, not a unidirectional manner.

In connection with FIG. 4, only an example of synthesizing an image and manual information by an image processing method was described, that is, it was described that an appearance of an image forming apparatus is extracted from the generated image and an apparatus region is detected from the extracted appearance. However, in case of an image forming apparatus having a marker, it is possible to synthesize generated image data and manual information by using a marker detecting method. In addition, other methods than the aforementioned method may be employed.

FIGS. 5 to 10 are diagrams illustrating various examples of a user interface window which is displayable in the mobile device of FIG. 1 according to a first exemplary embodiment. To be specific, a scenario according to the first exemplary embodiment relates to an example of a user interface window which may be displayed in response to occurrence of an error of an image forming apparatus.

Figure 5:
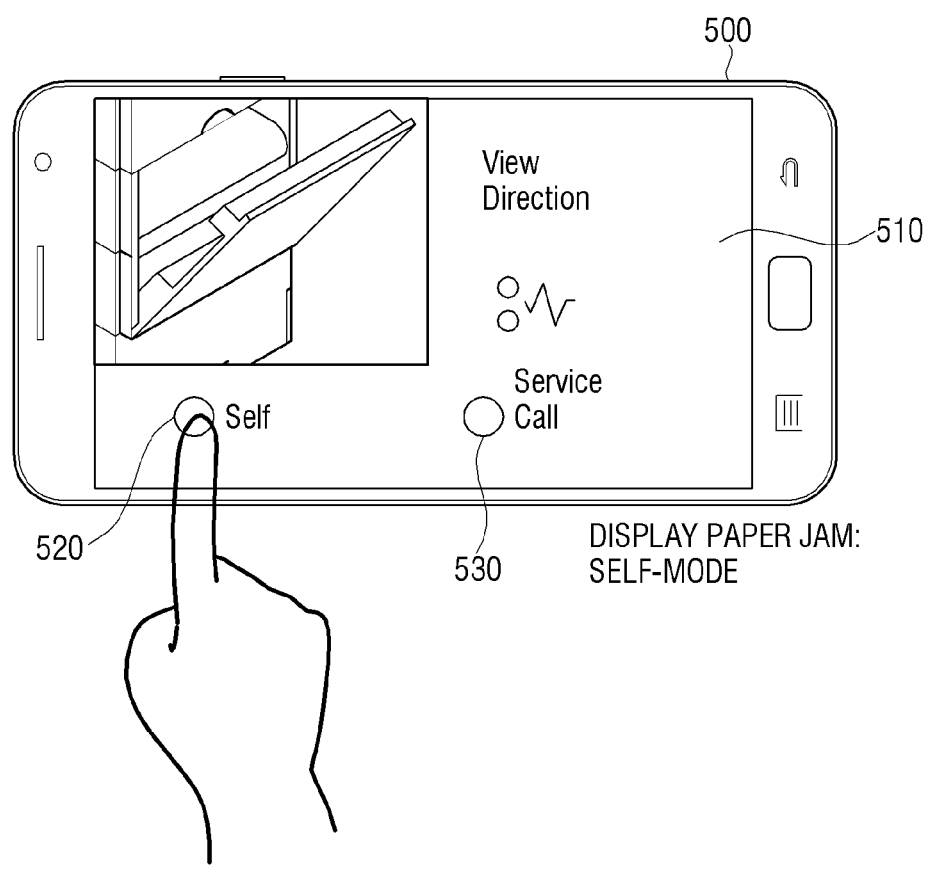
FIGS. 5 to 10 are diagrams illustrating various examples of a user interface window which is displayable in the mobile device of FIG. 1 according to a first exemplary embodiment.

FIG. 5 illustrates a first example of a user interface window which may be displayed in response to occurrence of a jam of an image forming apparatus.

Referring to FIG. 5, a user interface window 500 displays information 510 notifying the occurrence of a jam and a region 520, 530 for receiving a selection of a method for processing a jam on a side of an image generated by photographing an image forming apparatus.

In response to a second processing method 530 being selected by a user, the mobile device 200 requests to the management server to call a service engineer.

Figure 6:
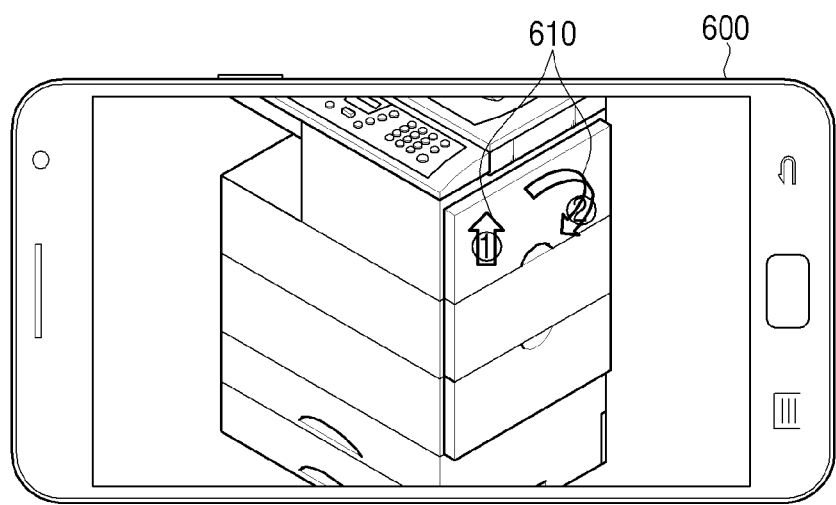

In response to a first processing method 520 being selected by the user, a user interface window such as that shown in FIG. 6 may be displayed.

FIG. 6 illustrates an example of a user interface window which may be displayed in response to the region 520 in FIG. 5 being selected.

Referring to FIG. 6, a user interface window 600 displays a photograph image which is currently photographed and manual information in a form of the augmented reality image. To be specific, the mobile device 200 displays user manipulation information on an apparatus region 610 where a user manipulation necessary for processing a jam will be executed by detecting an appearance of an image forming apparatus from the generated photograph image and considering a relative location in the detected appearance. Accordingly, a user is able to manipulate the image forming apparatus with reference to the displayed user interface window 600.

Figure 7:
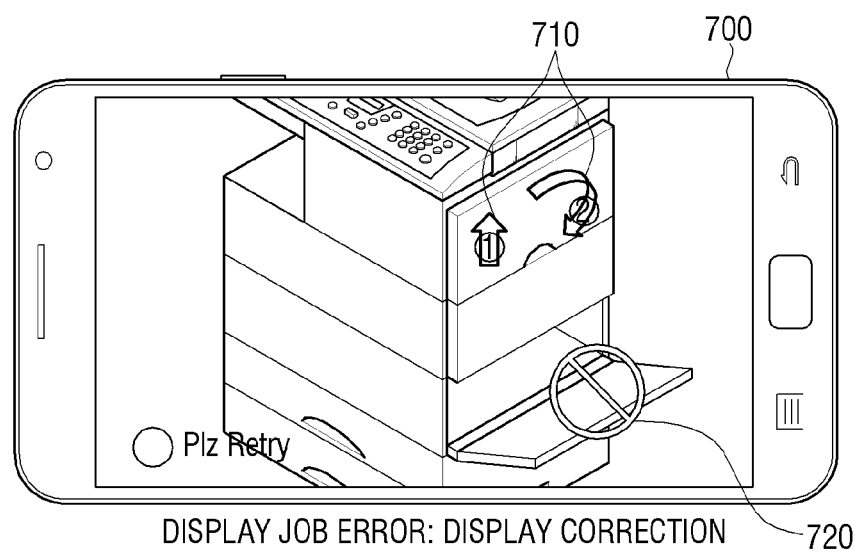

In response to other region than the displayed apparatus region being manipulated by the user, a user interface window such as that shown in FIG. 7 may be displayed.

FIG. 7 illustrates an example of a user interface window which may be displayed in response to an apparatus region which does not correspond to manipulation information as shown in FIG. 6 being manipulated by a user.

Referring to FIG. 7, a user interface window 700 displays a photograph image which is currently photographed and manual information in a form of the augmented reality image. To be specific, in response to a user manipulation being performed with respect to a region 710 different from a provided apparatus region, the user interface window 700 informs that the user manipulation was performed with respect to a wrong apparatus region 720 through a screen of the user interface window 600 of FIG. 6. By such interaction, a user is able to process a jam more easily.

Figure 8:
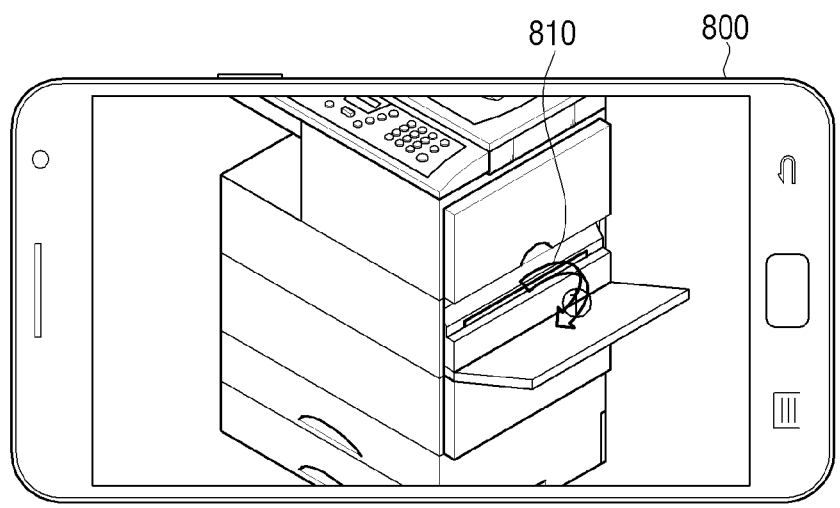

In response to the user manipulation being performed with respect to a correct apparatus region, a user interface window such as that shown in FIG. 8 may be displayed.

FIG. 8 illustrates an example of a user interface window which may be displayed in response to a manipulation corresponding to the manipulation information as shown in FIG. 6 being performed by a user.

Referring to FIG. 8, a user interface window 800 displays a photograph image which is currently photographed and manual information on a next step in a form of the augmented reality image. To be specific, the user interface window 800 displays, on a new apparatus region 810, information on a manipulation which should be performed by a user after the manipulation corresponding to the manipulation information in FIG. 6 is performed.

Figure 9:
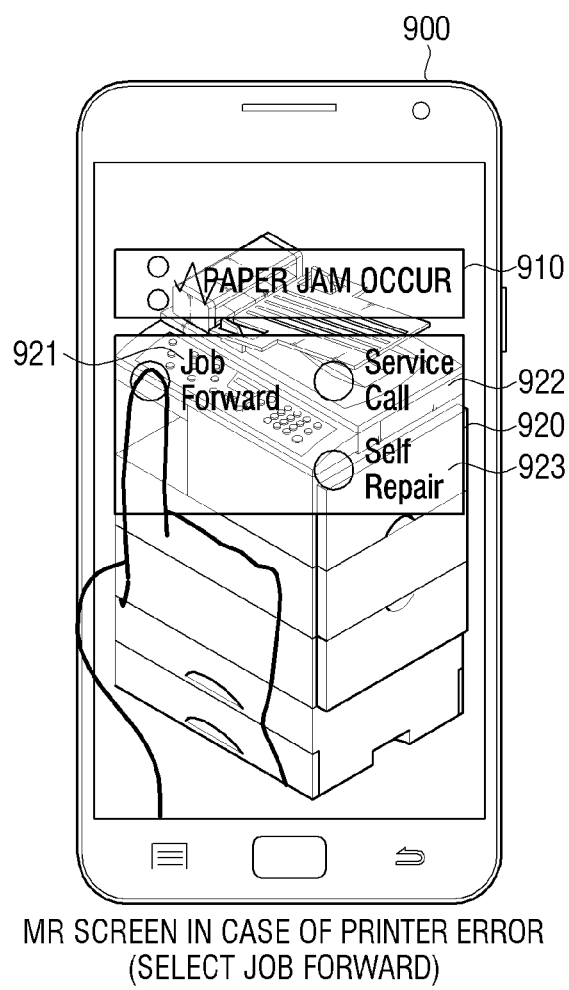

FIG. 9 illustrates a second example of a user interface window which may be displayed in response to occurrence of a jam in an image forming apparatus.

Referring to FIG. 9, a user interface window 900 displays information 910 notifying the occurrence of a jam and a region 920 for receiving a selection of a method for processing a jam on a side of an image generated by photographing an image forming apparatus.

The region 920 for receiving a selection of a method for processing a jam includes a forward select region 921 for transmitting a job to other apparatus, a service engineer-call select region 922, and a self-repairing select region 923.

Figure 10:
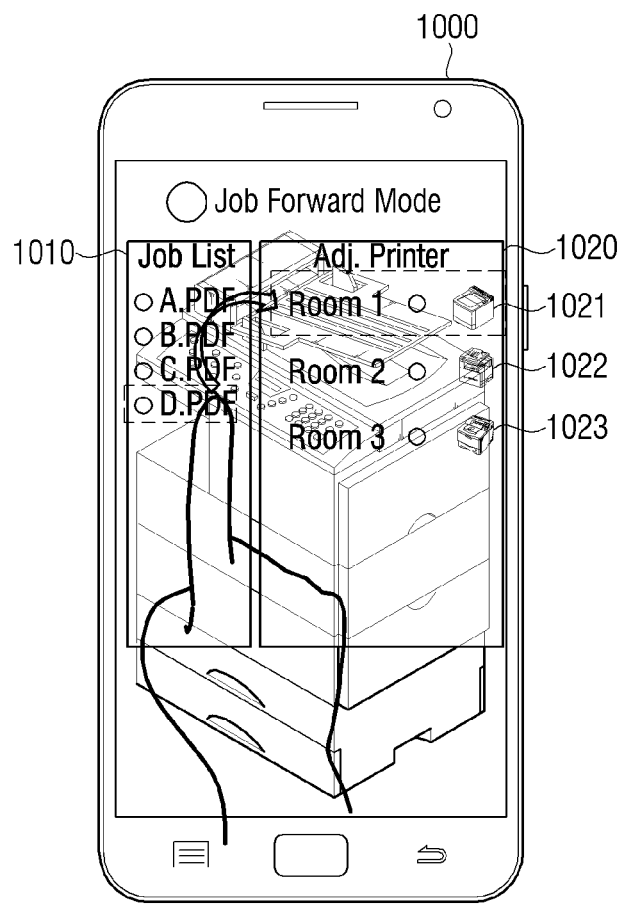

In response to the forward select region 921 being selected by a user, a user interface window such as that shown in FIG. 10 may be displayed to transmit a job which is pending in the image forming apparatus to other image forming apparatus.

In response to the service engineer-call select region 922 being selected by the user, the mobile device 200 requests to the management server to call a service engineer.

In response to the self-repairing region 923 being selected by the user, a user interface window such as that shown in FIG. 6 may be displayed.

FIG. 10 illustrates an example of a user interface window which may be displayed in response to the forward select region of FIG. 9 being selected.

Referring to FIG. 10, a user interface window 1000 includes a work region 1010 for displaying a job which is pending in the image forming apparatus 100 along with an image which is currently photographed and other apparatus region 1020 for displaying other adjacent image forming apparatus.

In response to the user interface window 1000 being displayed, a user is able to drag and move a job displayed on the work region 1010 to other apparatus. For example, in response to a D.pdf document being dragged to Room 1 by a user, the mobile device 200 may send the current image forming apparatus 100 a command for transmitting the D.pdf document to one or more other image forming apparatuses 1021, 1022, and 1023.

Figure 11:
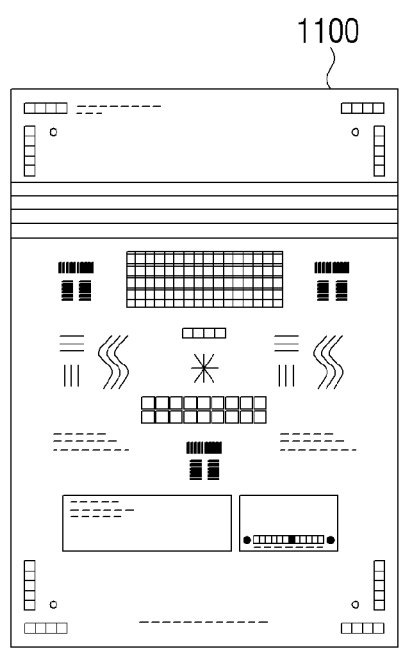
FIGS. 11 to 13 are diagrams provided to describe a method for providing a manual according to a second exemplary embodiment.
Figure 12:
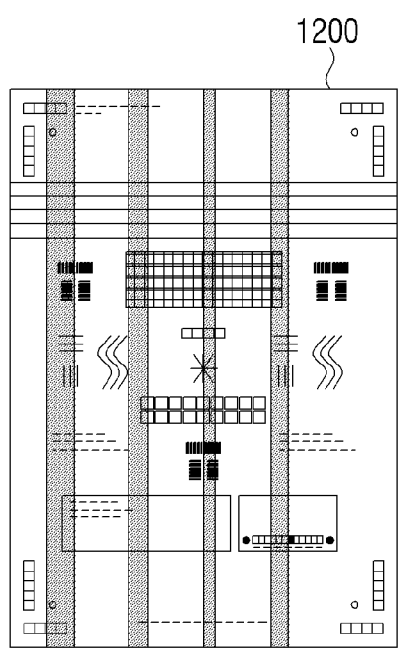
Figure 13:
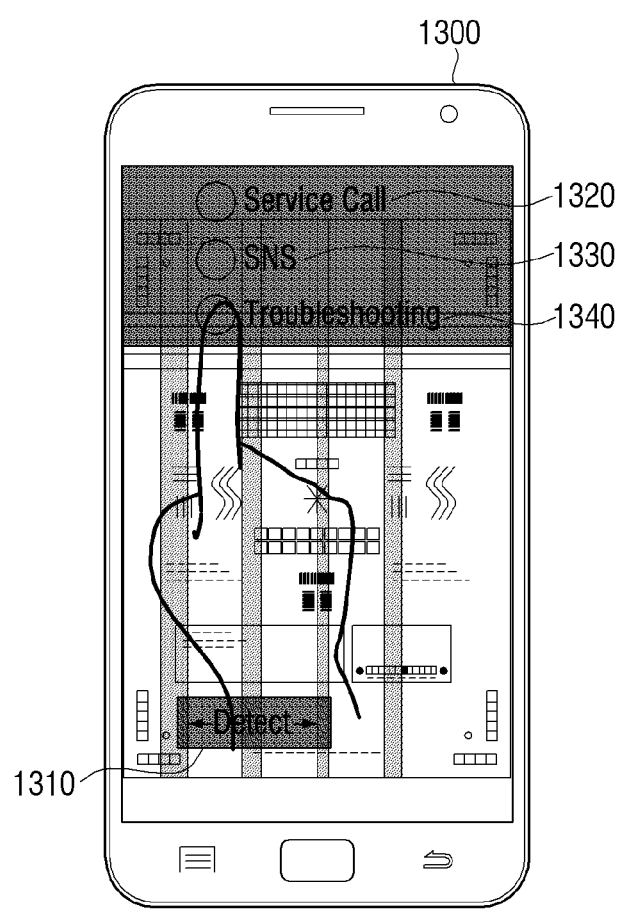

FIGS. 11 to 13 are diagrams provided to describe a method for providing a manual according to a second exemplary embodiment. To be specific, a scenario according to the second exemplary embodiment is a scenario for managing maintenance of an image forming apparatus in the mobile device 200 by using an original chart.

To be specific, FIG. 11 illustrates an image of an original chart for correction, FIG. 12 illustrates an output image of the original chart, and FIG. 13 illustrates an augmented reality image of the output image of FIG. 12.

Referring to FIGS. 11 to 13, a user photographs an output of an original chart by using the mobile device 200. By using image data generated according to the photographing operation, the mobile device 200 may determine whether correction with respect to the image forming apparatus is necessary, and when it is determined so, the mobile device 200 may display manual information 1100 or a processing method 1200 for correction as an augmented reality image.

To be specific, a user interface window 1300 displays a region 1310 for displaying information on a part which requires the correction and a region 1320, 1330, 1340 for receiving a selection of a method for performing maintenance concurrently with displaying a photograph image of the output of the original chart.

Accordingly, a user is able to perform maintenance with respect to the image forming apparatus by selecting a region corresponding to a desired method. For example, in response to the region 1320 being selected, the mobile device 200 may call a service engineer for the maintenance. In response to the region 1330 being selected, the mobile device 200 may display a screen for displaying a message of other user regarding the image forming apparatus. In response to the region 1340 being selected, the mobile device 200 may display manual information for the maintenance which may be executed by the user.

Figure 15:
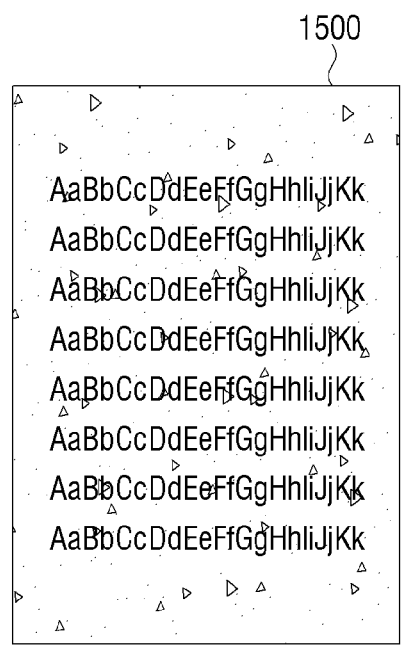
Figure 16:
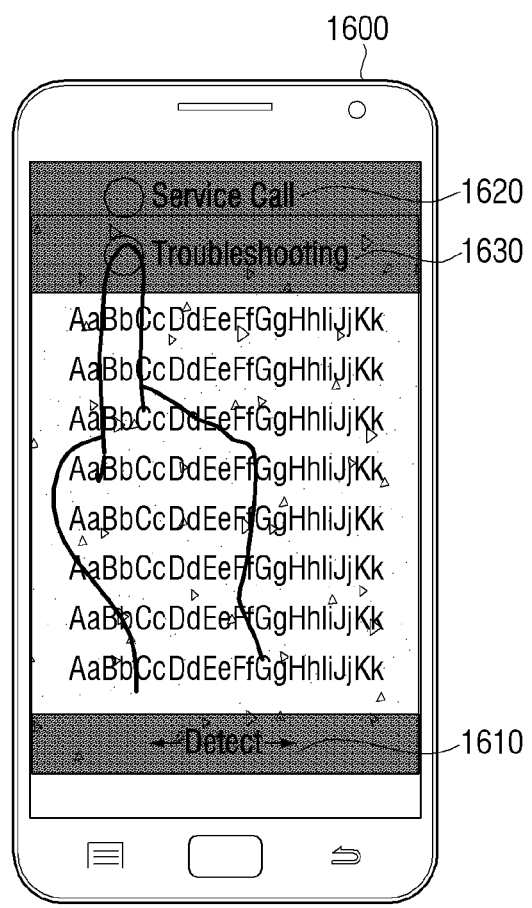

FIGS. 14 to 16 are diagrams provided to describe a method for providing a manual according to a third exemplary embodiment. To be specific, a scenario according to the third exemplary embodiment is a scenario for managing maintenance of an image forming apparatus in the mobile device 200 by using an output.

To be specific, FIG. 14 illustrates a manuscript image 1400 of a copied manuscript, FIG. 15 illustrates an output image of a manuscript image 1500, and FIG. 16 illustrates an augmented reality image of the output image of FIG. 15.

Referring to FIGS. 14 to 16, a user photographs an output by using the mobile device 200. The mobile device 200 may perform an image processing operation with respect to the generated image, determine that the image is an image of a manuscript, and determine whether the manuscript image has an error. In response to a print quality being determined as poor, the mobile device 200 may display job execution for cleaning the image forming apparatus as an augmented reality image.

To be specific, a user interface window 1600 displays a region 1610 determined as requiring cleaning and a region 1320, 1330 for receiving a selection of a method of performing cleaning concurrently with displaying a photograph image of the output.

Accordingly, a user is able to select a region corresponding to a desired method and perform cleaning with respect to the image forming apparatus. For example, in response to region 1620 being selected, the mobile device 200 may call a service engineer for the cleaning. In response to the region 1630 being selected, the mobile device 200 may display manual information for a cleaning operation which may be performed by the user.

Figure 17:
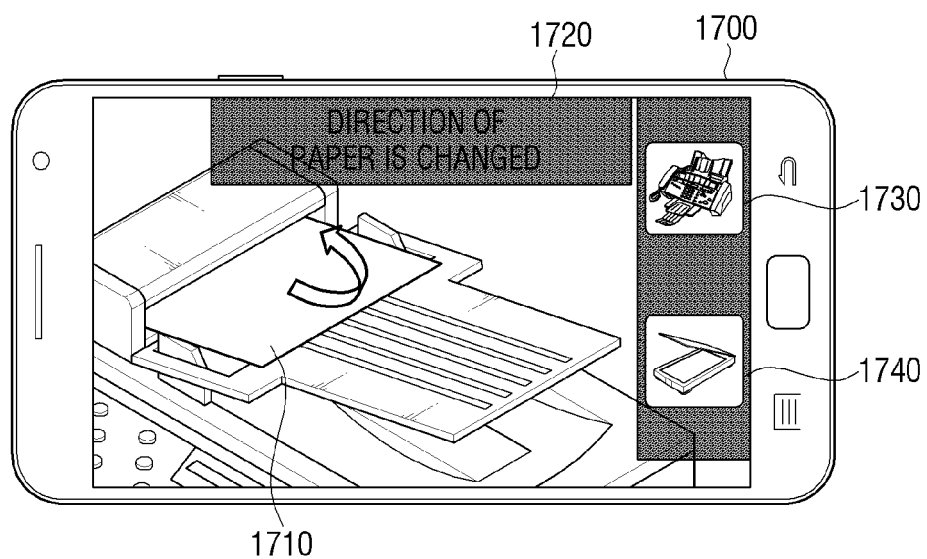
FIGS. 17 to 19 are diagrams provided to describe a method for providing a manual according to a fourth exemplary embodiment.
Figure 18:
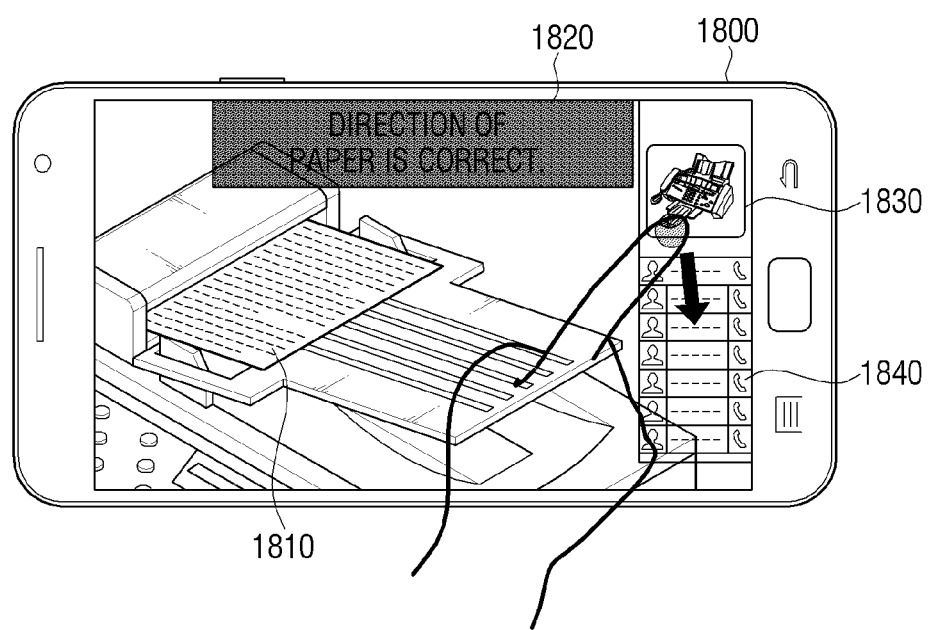
Figure 19:
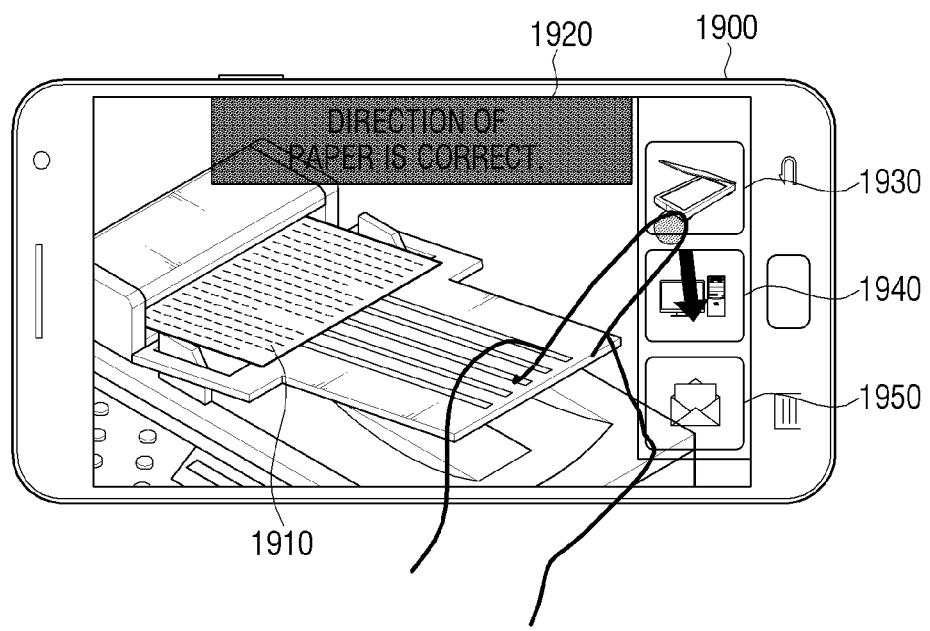

FIGS. 17 to 19 are diagrams provided to describe a method for providing a manual according to a fourth exemplary embodiment. To be specific, a scenario according to the fourth exemplary embodiment relates to examples of a user interface window which may be displayed while functions of an image processing apparatus are executed.

To be specific, FIG. 17 illustrates an example of a user interface window which may be displayed in response to a manuscript being stored in the scanning unit by a user to transmit a fax or perform a scanning job.

Referring to FIG. 17, a user interface window 1700 displays an image generated by a photographing operation and manual information 1720 in a form of augmented reality. To be specific, the mobile device 200 senses that a job that a user wishes to perform relates to a scanning job and displays a job select region 1730, 1740 for receiving an input of a job command related to the scanning job. In addition, the mobile device 200 having manuscript arrangement information in a scanning job of the image forming apparatus 100 as the manual information may determine whether a manuscript 1710 is arranged in a correct direction on a tray of the scanning unit by using an image sensing method. When it is determined that the manuscript is not arranged in a correct direction, the mobile device 200 may display a message 170 notifying that an arrangement direction of the manuscript is incorrect.

Subsequently, in response to the manuscript being arranged in a correct direction by the user and the fax send region 1730 being selected, a user interface window such as that shown in FIG. 18 may be displayed.

Alternatively, in response to a scan region 1740 being selected by the user, a user interface window such as that shown in FIG. 19 may be displayed.

FIG. 18 illustrates an example of a user interface window which may be displayed in response to the fax send region of FIG. 17 being selected.

Referring to FIG. 18, a user interface window 1800 displays information 1820 on an arrangement direction of a manuscript 1810, information 1830 on a selected job, and information 1840 on addresses stored in the mobile device 200 along with a generated image.

In such environment, a user is able to place an icon representing information on a selected job on an address region corresponding to a fax recipient, by using a dragging method. In this case, the mobile device 200 may send the image forming apparatus 100 a command for sending a fax to the address region where an icon is dragged.

FIG. 19 illustrates an example of a user interface window which may be displayed in response to the scan region of FIG. 17 being selected.

Referring to FIG. 19, a user interface window 1900 displays information 1920 on an arrangement direction of a manuscript 1910, information 1930 on a selected job, and a region 1940, 1950 for receiving a selection of a storage of a result of a scanning job, along with a generated image.

In such environment, a user is able to place an icon 1930 representing the information on a selected job to a receiving position for receiving scan data by using a dragging method. In this case, the mobile device 200 may send the image forming apparatus 100 a command for transmitting generated scan data to an apparatus where the icon is dragged.

Figure 20:
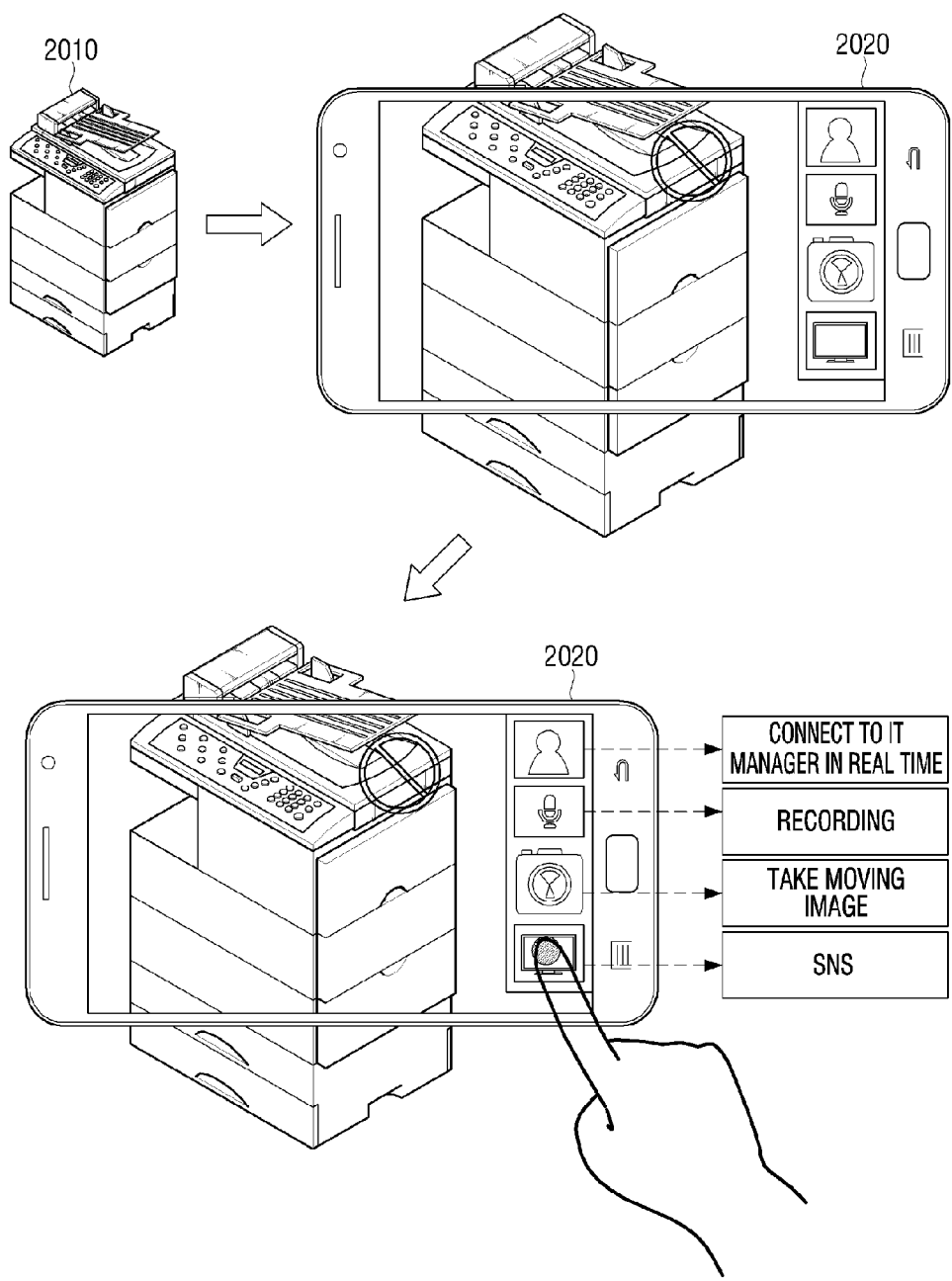
FIGS. 20 and 21 are diagrams provided to describe a method for providing a manual according to a fifth exemplary embodiment.
Figure 21:
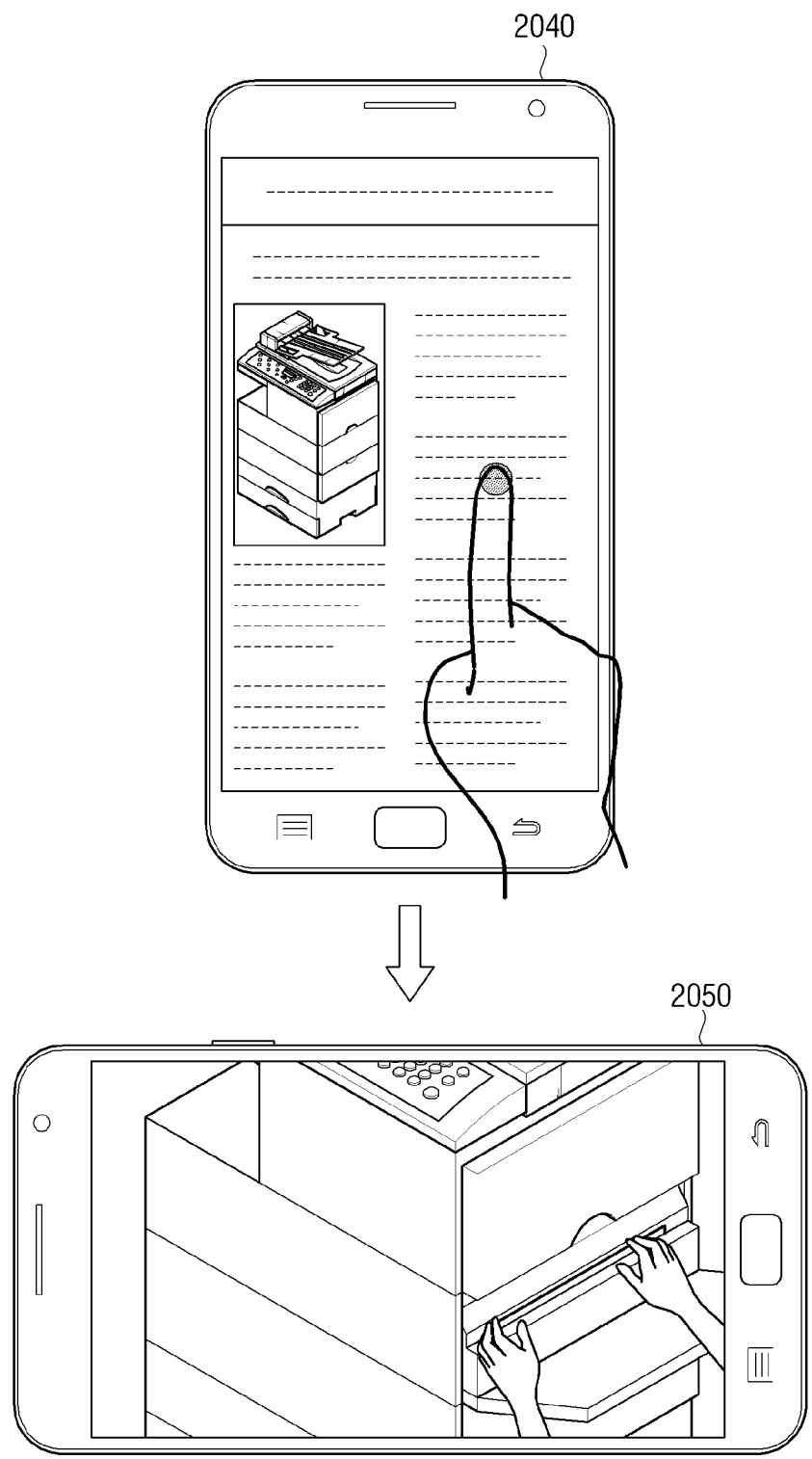

FIGS. 20 and 21 are diagrams provided to describe a method for providing a manual according to a fifth exemplary embodiment. To be specific, the scenario according to the fifth exemplary embodiment relates to an exemplary embodiment of using a SNS.

Referring to FIG. 20, a user is able to perform an NFC tagging operation between an image forming apparatus 2010 and a mobile device that the user wishes to use and photograph the image forming apparatus. Accordingly, the mobile device 200 displays a list 2020 of jobs which are executable with a photograph image. A job list includes jobs of connecting a telephone call with an engineer, recording a user voice for resolving an error in a corresponding apparatus, taking a moving image for resolving an error in the corresponding apparatus and a region for checking a message uploaded by other user with respect to the corresponding image forming apparatus.

In response to the region for checking a message uploaded by other user being selected by a user, as shown in FIG. 21, the mobile device 200 displays a list regarding the message uploaded by other user and/or a moving image. In response to one of the list being selected by the user, the mobile device 200 may display the selected message 2040 or moving image 2050. Accordingly, the user is able to process the error with reference to an error processing method performed by other user. In addition, the user is able to generate a message or a moving image by using voice recording or moving image recording on the list 2020 and register the message or moving image on the management server.

Figure 22:
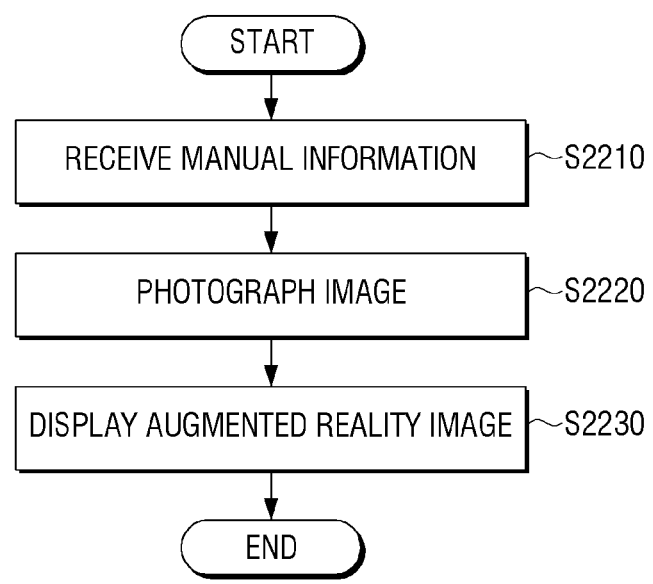
FIG. 22 is a flow chart provided to describe a method for providing a manual of a mobile device according to an exemplary embodiment.

FIG. 22 is a flow chart provided to describe a method for providing a manual of a mobile device according to an exemplary embodiment.

Referring to FIG. 22, status information is received from an image forming apparatus, and manual information corresponding to the received status information is received (S2210). A receiving operation of the manual information will be described in detail with reference to FIG. 23.

An image is generated (S2220). To be specific, consecutive images (that is, a moving image) may be generated by using an imaging device of a mobile device. In FIG. 22, an image is generated after the manual information is received, but the image may be generated before the manual information is received or generated concurrently with the aforementioned receiving operation, in the implementation.

The generated image and the received manual information may be synthesized and displayed (S2230). To be specific, an appearance of an image forming apparatus may be sensed from the generated image, an apparatus region corresponding to user manipulation information is sensed based on the sensed appearance, and the user manipulation information may be displayed on the sensed apparatus region in a form of augmented reality. In this case, the displayed augmented reality image may reflect a feedback of sensor information provided by the image forming apparatus 100 according to a user manipulation with respect to the image forming apparatus.

The method for providing a manual according to above exemplary embodiment enables a user to control the image forming apparatus easily on the mobile device 200. In addition, the mobile device 200 provides information and control with respect to the image forming apparatus in a form of the augmented reality, and thus, a user is able to manipulate the image forming apparatus 100 more intuitionally. Further, the mobile device 200 receives a feedback regarding a change of the image forming apparatus according to the user manipulation from the image forming apparatus, and thus, information may be provided in an interactional manner, not a unidirectional manner. The method for providing a manual as shown in FIG. 22 may be performed on a mobile device having a structure such as that shown in FIG. 4 and may be performed on a mobile device having other structure.

In addition, a method for providing a manual may be embodied as a program having an executable instructions which may be executed in a computer, and the program may be provided by being stored in a non-transitory computer readable medium.

Figure 23:
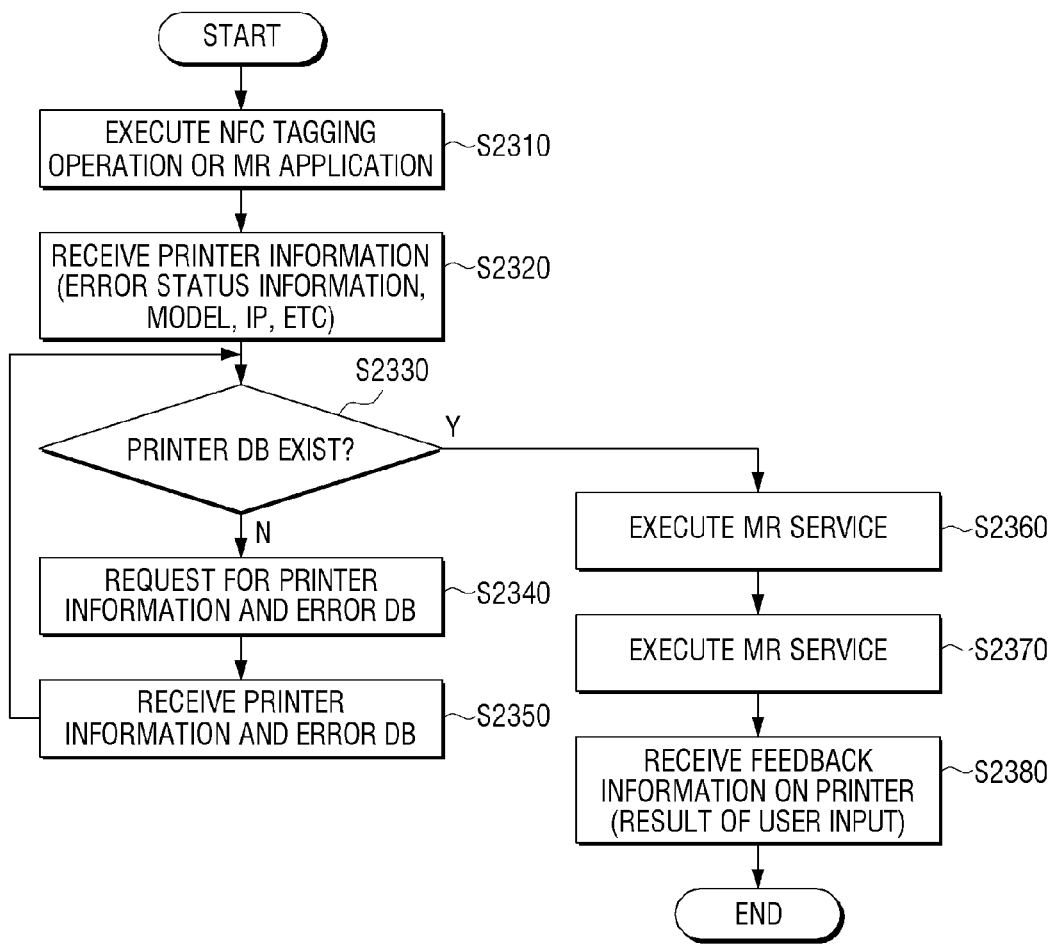
FIG. 23 is a flow chart provided to specifically describe a step of receiving manual information of FIG. 22.

FIG. 23 is a flow chart provided to specifically describe an operation of receiving error status of FIG. 22.

Referring to FIG. 23, in order to select an image forming apparatus to perform a job, a user is able to NFC tag the mobile device 200 with the image forming apparatus 100 or execute an application for displaying augmented reality (S2310).

Apparatus information, such as error status information and model information, is received from the selected image forming apparatus (S2320).

Based on they received apparatus information, whether manual information with respect to the image forming apparatus is stored in the mobile device 200 is determined (S2330). In the implementation, it is possible to determine whether the manual information is stored in the mobile device 200 and the manual information is stored in the image forming apparatus 100.

When it is determined that the manual information is not stored (S2330-N), the manual information with respect to the image forming apparatus may be requested and received through a management server (S2340, S2350).

When it is determined that the manual information is stored (S2330-Y), an augmented reality service is executed (S2360), a photograph image is generated, and the generated photograph image and the manual information are displayed (S2370).

In response to changed status information being received from the image forming apparatus after the display, an augmented reality image is displayed by reflecting the chanted status information (S2380).

Figure 24:
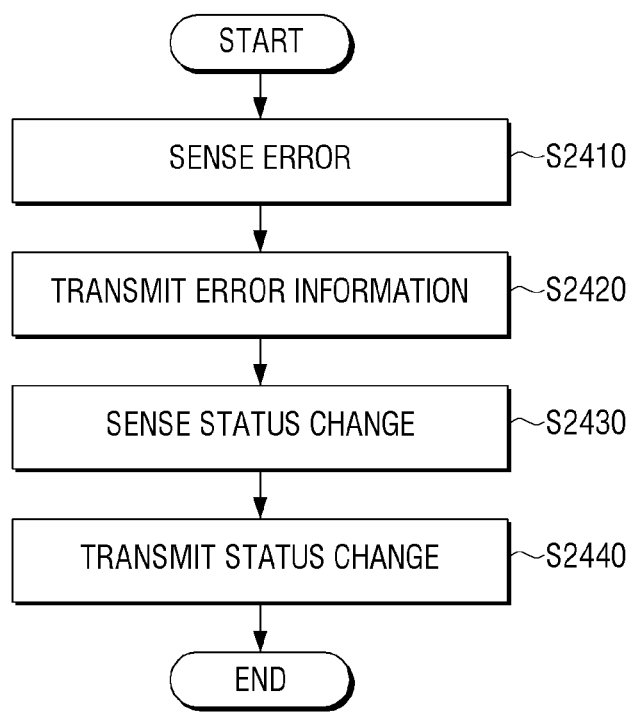
FIG. 24 is a flow chart provided to describe a method of operating an image forming apparatus according to an exemplary embodiment.

FIG. 24 is a flow chart provided to describe a method of operating an image forming apparatus according to an exemplary embodiment.

Referring to FIG. 24, in response to occurrence of an error in the image forming apparatus (S2410), apparatus information including information on the error is transmitted to the connected mobile device 200 (S2420). In response to manual information for resolving the error being stored in the image forming apparatus, the manual information is transmitted. In response to manual information for resolving the error not being stored in the image forming apparatus a model number of the image forming apparatus and an error code corresponding to the error may be transmitted to the mobile device 200.

A status change of each component in the image forming apparatus is sensed (S2430), and the sensed status change is transmitted to the mobile device 200 (S2440). To be specific, a status change of various sensors for sensing whether components in the image forming apparatus are connected correctly, the components operate well, a paper or a toner is provided, or a door is opened is sensed, and in response to the status change being sensed, the status change may be notified to the mobile device 200.

The method of operating an image forming apparatus according to an exemplary embodiment enables a user to perform a job according to a control command transmitted from the mobile device 200. Accordingly, a user is able to input a job command with respect to the image forming apparatus easily. In addition, the status change in the image forming apparatus 100 according to provision of the manual information is provided to the mobile device 200, and thus, information may be provided according to an interaction due to a user manipulation. The method of operating an image forming apparatus as in FIG. 24 may be executed on an image forming apparatus having a structure such as that shown in FIG. 3, and may be executed on an image forming apparatus having other structure.

In addition, the method of operating an image forming apparatus may be embodied as a program having an executable algorithm which may be executed in a computer, and the program may be provided by being stored in a non-transitory computer readable medium.

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disk, DVDs, and Blu-ray disks; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The foregoing exemplary embodiments and advantages are merely exemplary and are not to be construed as limiting. The teaching of the exemplary embodiments can be readily applied to other types of devices. Also, the description of exemplary embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A mobile device comprising:
an imaging unit configured to generate an image;
a communication interface configured to receive status information from an image forming apparatus corresponding to the generated image;
a controller, in response to a status of the image forming apparatus being determined as an error status based on the received status information, configured to control the communication interface to receive manual information including user manipulation information for resolving the error status of the image forming apparatus; and
a display configured to synthesize and display the generated image and the received manual information,
wherein the communication interface receives sensor information on a user manipulation made at the image forming apparatus, which is sensed by a sensor of the image forming apparatus, from the image forming apparatus, and the controller determines whether the user manipulation made at the image forming apparatus corresponds to the user manipulation information included in the manual information based on the received sensor information,
wherein in response to the user manipulation made at the image forming apparatus being determined as not corresponding to the user manipulation information included in the manual information, the controller controls the display to display a message indicating that the user manipulation was performed incorrectly.

2. The device as claimed in claim 1, wherein the controller controls the display to display the user manipulation information on an apparatus region of the displayed image, the apparatus region corresponding to the user manipulation information.

3. The device as claimed in claim 1, wherein in response to the user manipulation made at the image forming apparatus being determined as corresponding to the user manipulation information included in the manual information, the controller controls the display to display user manipulation information on a next step.

4. The device as claimed in claim 1, wherein the controller controls the communication interface to request for the manual information including the user manipulation information for resolving the error status from a management server.

5. The device as claimed in claim 1, wherein the controller controls the communication interface to search for another image forming apparatus which is adjacent to the image forming apparatus and transfer an ongoing operation to the searched image forming apparatus.

6. The device as claimed in claim 1, wherein the status information comprises at least one of model information on the image forming apparatus, error information on the image forming apparatus, and the sensor information sensed by the sensor of the image forming apparatus.

7. The device as claimed in claim 1, wherein the display displays the received manual information on the generated image in a form of augmented reality.

8. The device as claimed in claim 1, wherein the display extracts an appearance of the image forming apparatus from the generated image and displays the manual information on a position corresponding to the manual information in the extracted appearance.

9. The device as claimed in claim 1, wherein:
the imaging unit generates an image of an output of the image forming apparatus, and
in response to maintenance of the image forming apparatus being necessary based on the generated image, the controller controls the communication interface to receive manual information for the maintenance.

10. The device as claimed in claim 1, wherein:
the imaging unit generates an image of a manuscript loaded in a scanning unit of the image forming apparatus, and
the controller determines a direction of the manuscript loaded in the scanning unit based on the generated image, and in response to the direction of the manuscript being determined as being incorrect, controls the display to display an error message.

11. The device as claimed in claim 1, further comprising:
a manipulation input unit configured to receive a job command for a job to be executed by the image forming apparatus,
wherein the communication interface transmits the received job command to the image forming apparatus.

12. The device as claimed in claim 11, wherein the manipulation input unit receives a selection of address information corresponding to the job command from one of address information stored in the mobile device.

13. The device as claimed in claim 1, wherein:
the communication interface receives information registered by an other user on the image forming apparatus, and
the controller controls the display to display the information registered by the other user.

14. The device as claimed in claim 13, wherein the information registered by the other user is at least one of a message uploaded to a Social Network Service (SNS) in connection with the image forming apparatus and a moving image recorded with other user.

15. A method for providing a manual comprising:
generating an image;
receiving status information from an image forming apparatus corresponding to the generated image;
receiving, in response to a status of the image forming apparatus being determined as an error status based on the received status information, manual information including user manipulation information for resolving the error status of the image forming apparatus;
synthesizing and displaying the generated image and the received manual information;
receiving sensor information on a user manipulation made at the image forming apparatus, which is sensed by a sensor of the image forming apparatus from the image forming apparatus;
determining whether the user manipulation made at the image forming apparatus corresponds to the user manipulation information including in the manual information based on the received sensor information; and
in response to the user manipulation made at the image forming apparatus being determined as not corresponding to the user manipulation information included in the manual information, displaying a message indicating that the user manipulation was performed incorrectly.

16. At least one non-transitory computer readable medium storing computer readable instructions which when executed control at least one processer to implement a method comprising:
generating an image;
receiving status information from an image forming apparatus corresponding to the generated image;
receiving, in response to a status of the image forming apparatus being determined as an error status based on the received status information, manual information including user manipulation information for resolving the error status of the image forming apparatus;
synthesizing and displaying the generated image and the received manual information;
receiving sensor information on a user manipulation made at the image forming apparatus, which is sensed by a sensor of the image forming apparatus from the image forming apparatus;
determining whether the user manipulation made at the image forming apparatus corresponds to the user manipulation information including in the manual information based on the received sensor information; and
in response to the user manipulation made at the image forming apparatus being determined as not corresponding to the user manipulation information included in the manual information, displaying a message indicating that the user manipulation was performed incorrectly.

* * * * *